United States Patent [19]

Hunt

[11] Patent Number: 5,056,091
[45] Date of Patent: Oct. 8, 1991

[54] METHOD FOR HANDLING ERRORS DETECTED IN A COMPUTER SYSTEM

[75] Inventor: Douglas B. Hunt, Mountain View, Calif.

[73] Assignee: Hewlett-Packard Company, Palo Alto, Calif.

[21] Appl. No.: 494,005

[22] Filed: Mar. 15, 1990

[51] Int. Cl.$^5$ .............................................. G06F 11/00
[52] U.S. Cl. ........................................ 371/14; 371/12
[58] Field of Search ............................ 371/14, 12, 13

[56] References Cited

U.S. PATENT DOCUMENTS

| | | | |
|---|---|---|---|
| 3,784,801 | 1/1974 | Caputo et al. | 371/12 |
| 4,363,092 | 12/1982 | Abo et al. | 371/12 |
| 4,408,328 | 10/1983 | Wakai | 371/12 |
| 4,488,303 | 12/1984 | Abramovich | 371/12 |
| 4,538,265 | 8/1985 | Day et al. | 371/29.1 |
| 4,587,655 | 5/1986 | Hirao et al. | 371/12 |
| 4,618,953 | 10/1986 | Daniel et al. | 371/12 |
| 4,757,442 | 7/1988 | Sakata | 371/12 |

Primary Examiner—Jerry Smith
Assistant Examiner—Phung My Chung
Attorney, Agent, or Firm—Roland I. Griffin; Alan H. Haggard

[57] ABSTRACT

A quick freeze method and a clean freeze method allow for the halting of operation of all computing sections within a computing system upon detection of an error. In the quick freeze method, a first computing section detecting an error immediately halts operation. The first computing section notifies all adjacent computing sections of the detection of the error. Each computing section in the computing system, upon receiving notification of the detection of the error, immediately halts operation and notifies all adjacent computing sections of the detection of the error. In the clean freeze method, when a first computing section detects an error, all computing sections are notified of the detection of the error. When all computing sections of the computing system have been notified, all the computing sections within the computing system halt operation simultaneously. In order to allow for versatility, a computing system may be designed to allow the selection, at configuration, of either the clean freeze or the quick freeze method of halting operation of the computing system.

7 Claims, 6 Drawing Sheets

METHOD FOR HANDLING ERRORS DETECTED IN A COMPUTER SYSTEM

BACKGROUND

The present invention discusses methods for halting operation within a computing system when the computing system detects that an error has occurred.

Because of the high speeds at which computing systems Currently operate, it is generally not possible for a computing system to halt operation before the computing system writes new data into some or all of its storage elements. Often, it is impossible to stop some portions of the computing system for several computing cycles after the error is first detected simply because of the time it takes for a signal to propagate from one part of the computing system to another. While the computing system is being shut down, new data is written into some registers making it difficult to determine the exact cause of the error or to determine how the computing may be restarted without re-booting the operating system.

One prior art approach to attempt to preserve data is to incorporate within the computing system extra copies or duplicates of critical registers. The duplicate registers retain information about the state of the computing system for several cycles so that the state of the computing system may be reconstructed if an error is detected. However this approach is very costly to implement.

SUMMARY OF THE INVENTION

In accordance with the preferred embodiment of the present invention there is presented methods for halting operation of all computing sections within a computing system upon detection of an error. In the quick freeze method, a first computing section detecting an error immediately halts operation. The first computing section notifies all adjacent computing sections of the detection of the error. Each computing section in the computing system, upon receiving notification of the detection of the error, immediately halts operation and notifies all adjacent computing sections of the detection of the error.

In the clean freeze method, when a first computing section detects an error, all computing sections are notified of the detection of the error. When all computing sections of the computing system have been notified, all the computing sections within the computing system halt operation simultaneously.

Two implementation examples are given of the clean freeze method. In the first implementation example, the first computing section detecting an error notifies all adjacent computing sections of the detection of the error. Each computing section in the computing system, upon receiving notification of the detection of the error, notifies all adjacent computing sections of the detection of the error.

In the second implementation example, upon detecting an error, the first computing section notifies a central control module of the detection of the error. The central control module then notifies all computing sections within the computing system of the detection of the error.

In order to allow for versatility, a computing system may be designed to allow the selection of either the clean freeze or the quick freeze method of halting operation of the computing system. In normal operation, the computing system is configured so that the detection of an error causes a clean freeze. In this way, some information about the error may be collected for diagnostic purposes. The computing system is then restarted. In general, it may be necessary to terminate a job which was being executed at the time of the error, however, this is clearly preferable to terminating all jobs.

When the computing system is running in a diagnostic mode, the computing system is configured so that upon detection of an error, the quick freeze method is utilized to halt operation of the computing system. In this way, the computing system is stopped as quickly as possible so that as much information about the error as possible may be collected.

The present invention is an improvement over previous error handling mechanisms. The present invention does not require extra registers to save the state of the computing system. Yet the invention allows for a flexible approach to handling the detection of errors. During normal operation when an error is detected, some information may be collected about the error while, when possible, the computing system is left in a state from which it may be restarted. In diagnostic mode, as much information as possible is collected about conditions under which the error occurred, although typically in this case the computing system is not left in a state from which it may be restarted without re booting the operating system.

DESCRIPTION OF THE PREFERRED EMBODIMENT

Figure 1:
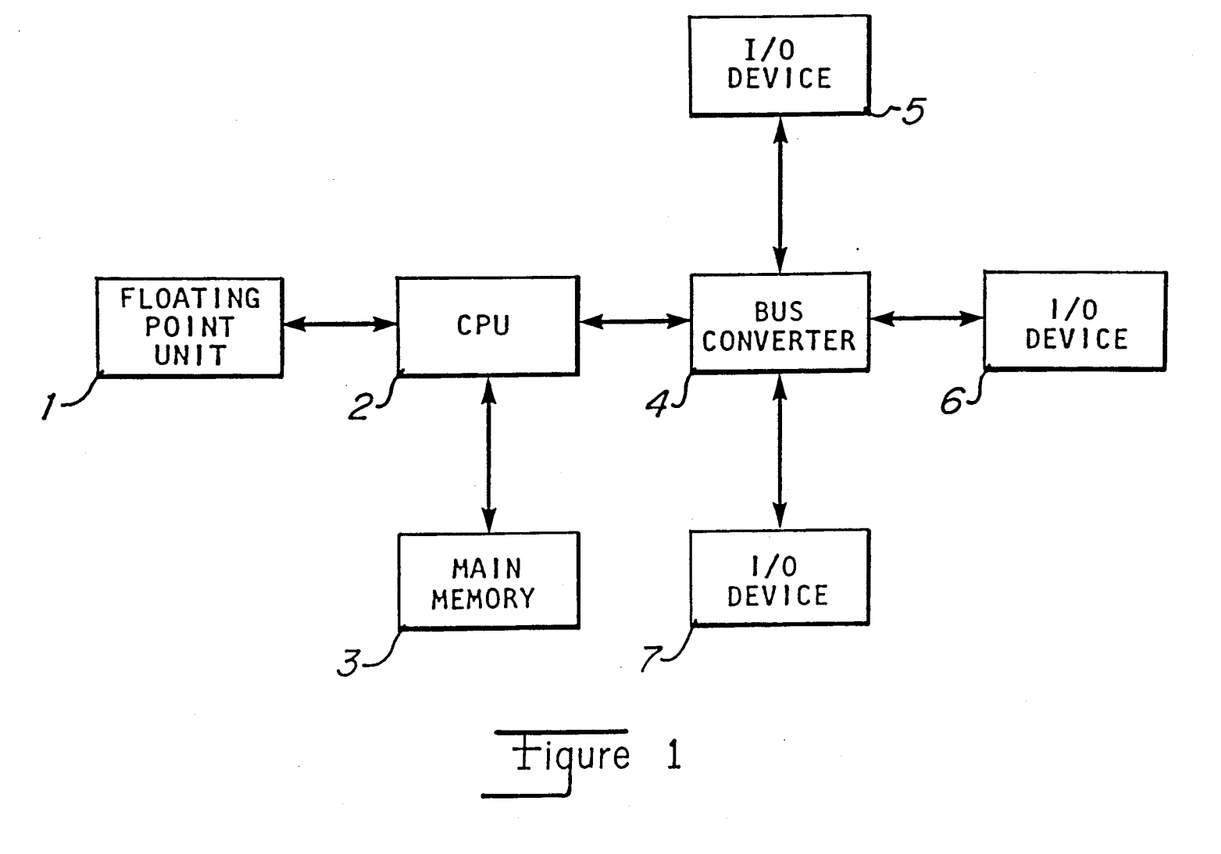
FIG. 1 shows a block diagram of a computing system.

FIG. 1 shows a block diagram of computing system. The computing system includes a central processing unit (CPU) 2, a floating point unit 1, a main memory 3, a bus converter 4, an input/output (I/O) device 5, an I/O device 6, and an I/O device 7. The present invention provides two basic methods of halting the computing system after an error has been detected.

In the first ("quick freeze") method, the object is to halt operation of the computing system as quickly as possible. The computing system is divided up into several computing sections. Each computing section is capable of halting (or "freezing") itself within a single computing cycle from the time the computing system detects an error condition. For example, in FIG. 1, each of CPU 2, floating point unit 1, main memory 3, bus converter 4, I/O device 5, I/O device 6, and I/O device 7 generally would be a separate computing section.

Figure 2:
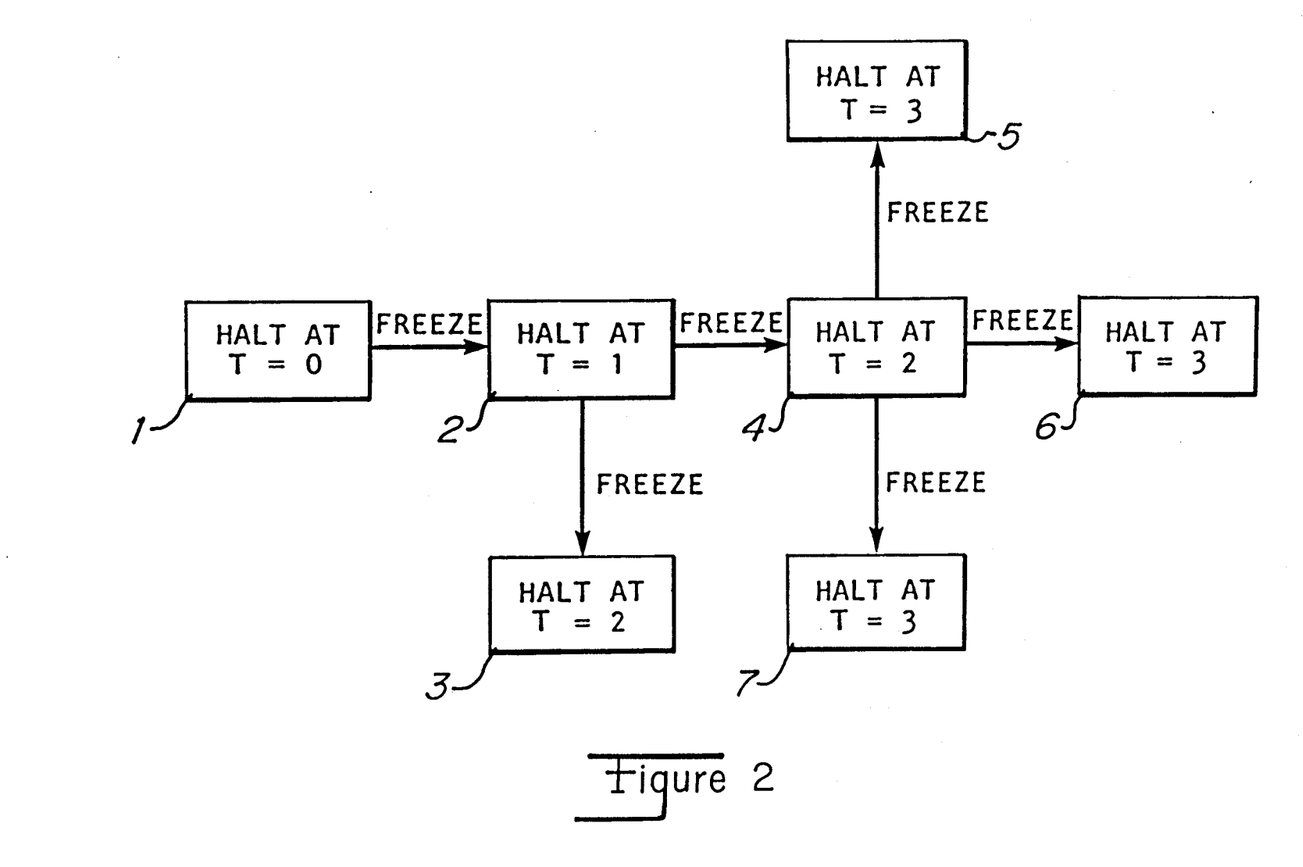
FIGS. 2 and 3 show the flow of error notification in the computing system shown in FIG. 1 in accordance with a second preferred embodiment of the present invention.
Figure 3:
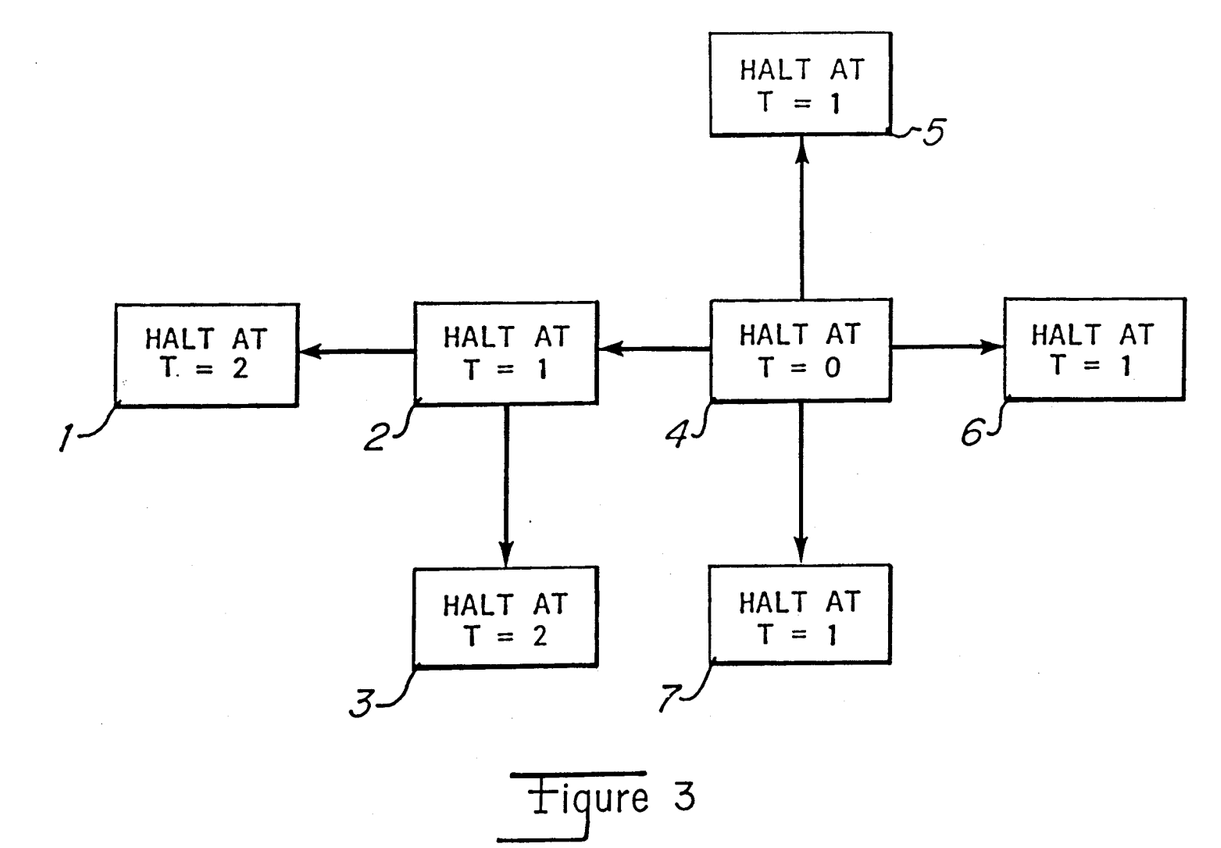

When an error is detected in a particular computing section, that computing section immediately halts operation and informs all adjacent computing sections that it has halted. On the next computing cycle, each of the adjacent computing sections halt and inform the computing sections adjacent to them that they have halted. The process continues until the entire computing system has stopped. In this manner, the computing system is halted quickly, preserving as much information as possible. This method is most likely to retain relevant information about why an error occurs because the computing section that is most likely to contain relevant information about the error, i.e., the computing section that first detects the error, halts as quickly as possible. FIGS. 2 and 3 show examples of how notification of an error flows the computing system when the quick freeze method is utilized.

In FIG. 2, at time t=0, floating point unit 1 detects an error. Immediately, floating point unit 1 halts operation and sends a freeze signal to CPU 2. Within a computing cycle (time t=1), CPU 2 halts operation and sends a freeze signal to main memory 3 and to bus converter 4. Within another computing cycle (time t=2), main memory 3 and bus converter 4 halt operation. Bus converter 4 sends a freeze signal to I/O device 5, I/O device 6 and I/O device 7. Within another computing cycle (time t=3), I/O device 5, I/O device 6 and I/O device 7 halt operation.

In FIG. 3, at time t=0, bus converter 4 detects an error. Immediately, bus converter 4 halts operation and sends a freeze signal CPU 2, I/O device 5, I/O device 6 and I/O device 7. Within a computing cycle (time t=1), CPU 2, I/O device 5, I/O device 6 and I/O device 7 halt operation. CPU 2 sends a freeze signal to main memory 3 and to floating point unit 1. Within another computing cycle (time t=2), main memory 3 and floating point unit 1 halt operation.

In the quick freeze method, illustrated by FIGS. 2 and 3, different computing sections of the computing system halt at different times. This leaves the computing system in an inconsistent state. In such an inconsistent state it is generally difficult, if not impossible, to restart the computing system without re-booting the computing system's operating system. However, generally when the operating system of a computing system is restarted, jobs running on the computing system at the time the computing system is halted must be restarted. This typically results in the loss of some data.

When it is determined that, after an error is detected, it is desirable to halt the computing system in a consistent state from which it may be possible to restart the computing system without re-booting the computing system's operating system, the second ("clean freeze") method may be utilized. In the clean freeze method, the object is to halt operation of all computing sections within the computing system simultaneously so that the computing system is in a consistent state. This should facilitate restarting the computing system without the necessity of re-booting its operating system.

When an error is detected in a particular computing section, that computing section informs all adjacent computing sections that an error has occurred. The computing section that has detected the error, however, continues operation, if possible, until there is opportunity for all the computing sections to be notified that the error has occurred. The amount of delay before halting depends upon how long it takes notification of the error to propagate to all computing sections within the computing system. When all computing sections in the computing system have been notified of the error, all the computing sections halt operation simultaneously.

Figure 4:
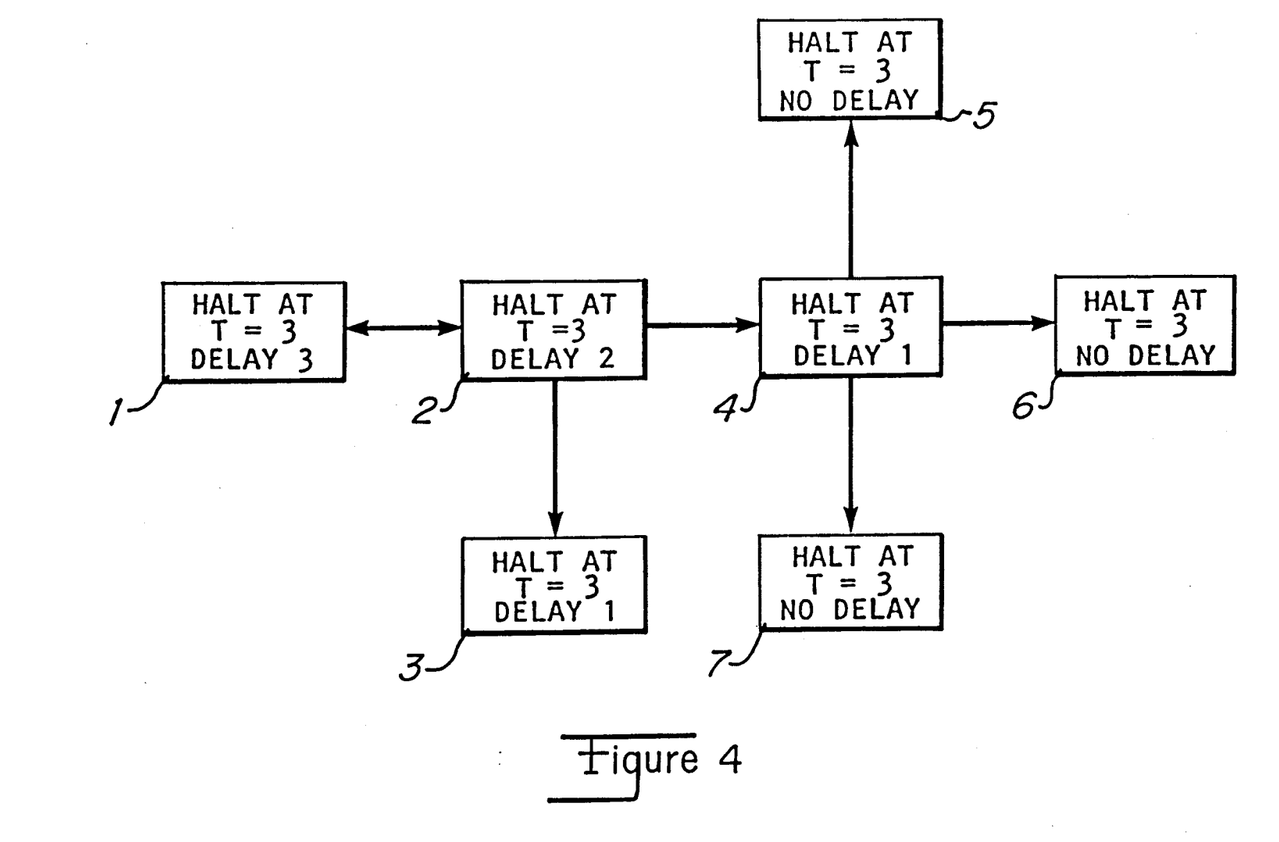
FIGS. 4 and 5 show the flow of error notification in the computing system shown in FIG. 1 in accordance with a second preferred embodiment of the present invention.
Figure 5:
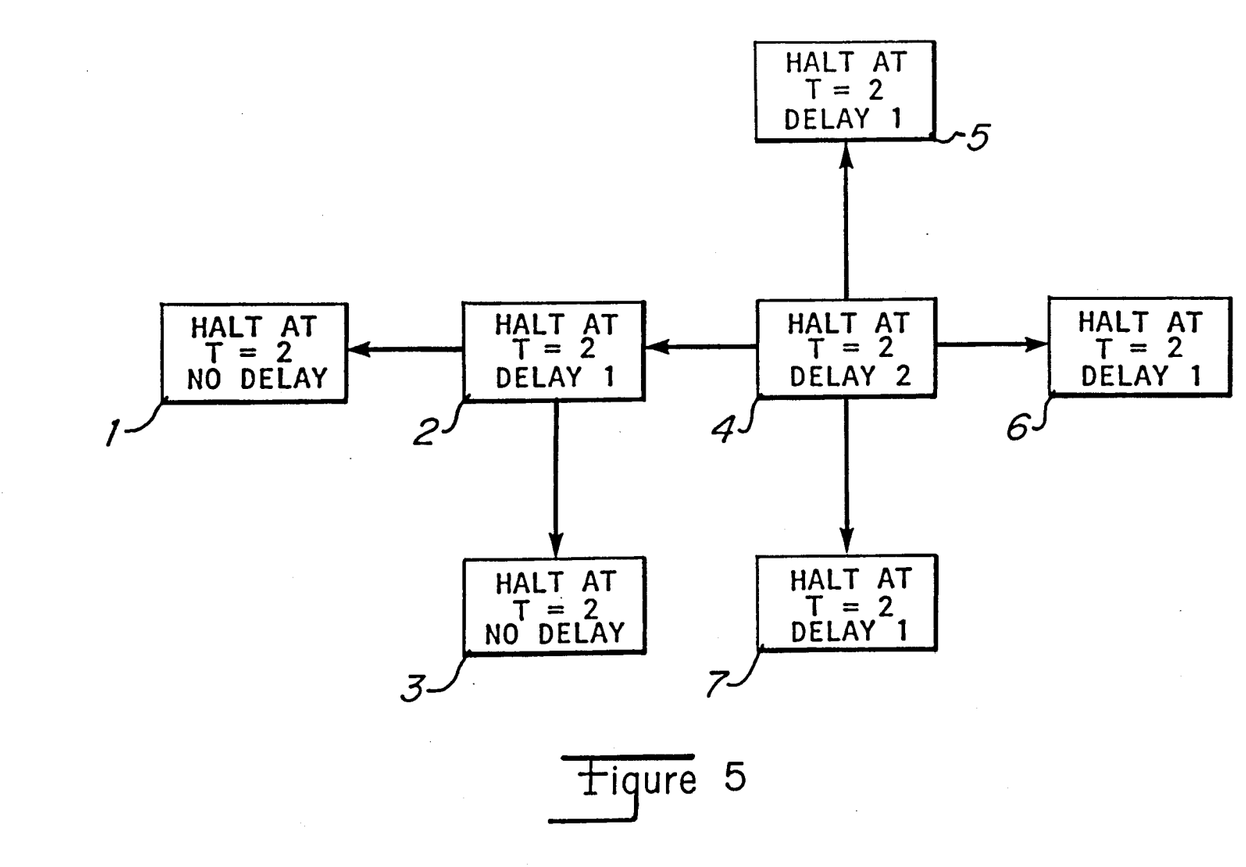

FIGS. 4 and 5 show examples of how the computing system reacts to detection of an error when the clean freeze method is utilized.

In FIG. 4, at time t=0, floating point unit 1 detects an error. Floating point unit 1 indicates to CPU 2 that an error has been detected. When an error is detected in floating point unit 1, it takes three computing cycles for the notification of the error to propagate through the computing system. Therefore, floating point unit 1 will delay three computing cycles before halting.

Within a computing cycle from when CPU 2 receives the indication that an error has been detected (time t=1), CPU 2 indicates to main memory 3 and to bus converter 4 that an error has occurred. CPU 2 will then delay two computing cycles before halting. Within a computing cycle from when main memory 3 and bus converter 4 receive an indication that an error has been detected (time t=2), bus converter 4 indicates to I/O device 5, I/O device 6 and I/O device 7 that an error has been detected. At time t=3, floating point unit 1, CPU 2, main memory 3, bus converter 4, I/O device 5, I/O device 6 and I/O device 7 all simultaneously halt operation.

In FIG. 5, at time t=0, bus converter 4 detects an error. Bus converter indicates to CPU 2, I/O device 5, I/O device 6 and I/O device 7 that an error has been detected. When an error is detected in bus converter 4, it takes two computing cycles for the notification of the error to propagate through the computing system. Therefore, bus converter 4 will delay two computing cycles before halting.

Within a computing cycle from when CPU 2 receives the indication that an error has been detected (time t=1), CPU 2 indicates to main memory 3 and floating point unit 1 that an error has occurred. CPU 2 will then delay one computing cycle before halting. At time t=2, floating point unit 1, CPU 2, main memory 3, bus converter 4, I/O device 5, I/O device 6 and I/O device 7 all simultaneously halt operation.

In the above-described implementation of the clean freeze method, when a particular computing section detects an error, the notification to adjacent computing section, depending upon the size and arrangement of computing sections in the computing system, may include information indicating to the adjacent computing section how long it is necessary to delay before halting. In the case of the computing system shown in FIG. 1, such information would be unnecessary. This is because in the computing system of FIG. 1, when a first computing section receives from a second computing section an indication that an error has occurred, the identity of the second computing section is sufficient information for the first computing section to determine how long to delay before halting.

When it is necessary to include information indicating the length of delay, this may be done, for example, either by specifying the identity of the computing section in which the error was first detected, or by sending a number indicating the amount of delay remaining before the computing system halts. If the identity of the computing section in which the error was first detected is sent, a table look-up could indicate to a computing section how long to delay before halting. If a number is sent which indicates the amount of delay remaining before the computing system halts, the computing section receiving the number would decrement the number before forwarding the number to adjacent computing sections.

Figure 6:
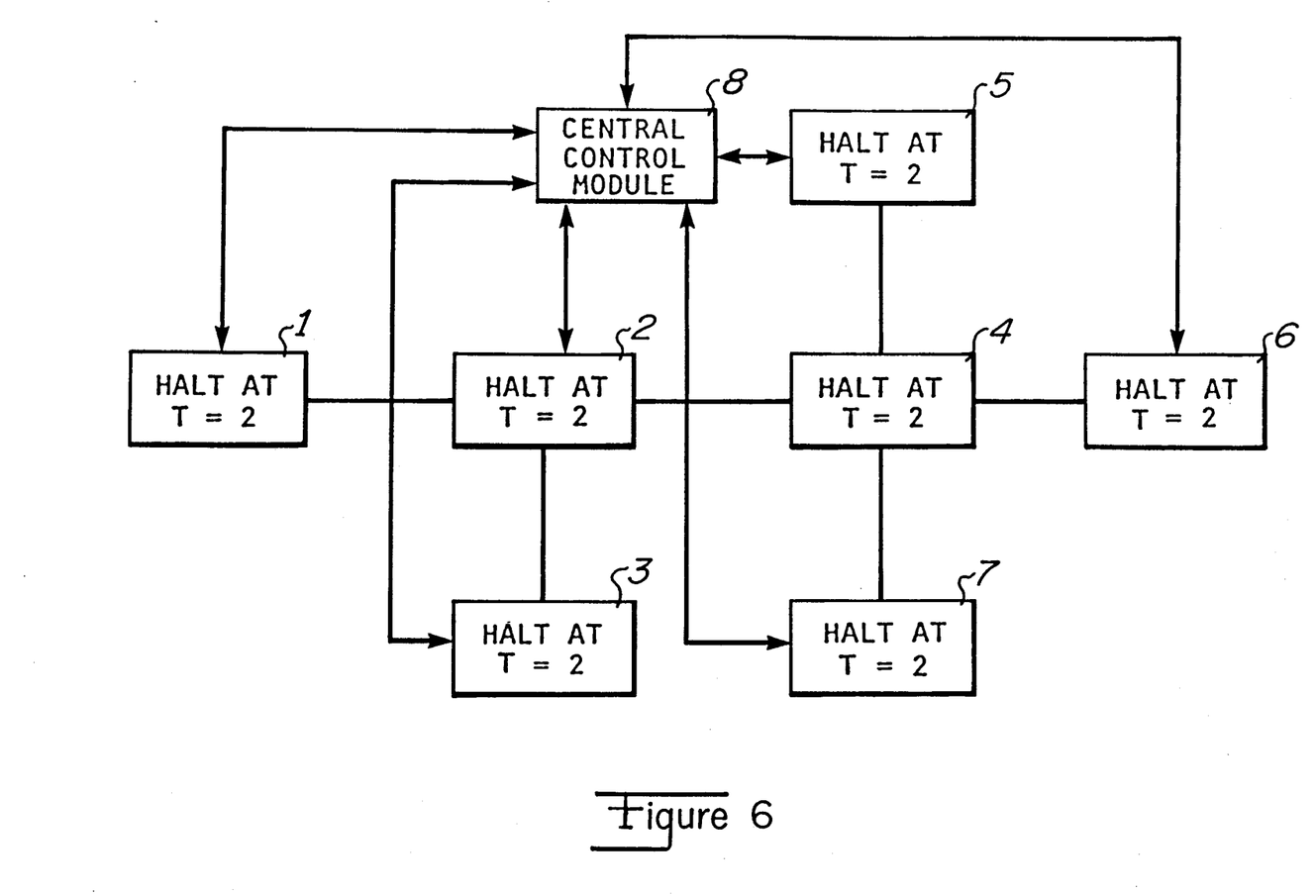
FIG. 6 shows the flow of error notification in the computing system shown in FIG. 1 in accordance with a third preferred embodiment of the present invention.

FIG. 6 illustrates an alternate way to implement the clean freeze method of halting the computing system after detection of an error. In FIG. 6, a central control module 8 has been added to the computing system of FIG. 1. When any of the computing sections detects an error, notification is sent to central control module 8. Central control module 8 then simultaneously notifies all computing sections in the computing system to halt. Depending upon the details of implementation, utilizing this version of the clean freeze method, once an error has been detected, there may be a delay of two or more computing cycles before operation of the computing system is halted.

Neither the clean freeze method nor the quick freeze method alone is an appropriate response to all errors under all operating conditions. Consequently, a computing system may be configured so that either the quick freeze method or the clean freeze method of halting the computing system may be selected depending on the current operating conditions. In normal operation, the computing system is configured so that the detection of an error causes a clean freeze. In this way, some information about the error may be collected for diagnostic purposes. The computing system is then restarted. In general, it may be necessary to terminate a job which was being executed at the time of the error, however, this is clearly preferable to terminating all jobs.

When the computing system is running in a diagnostic mode, the computing system is configured so that upon detection of an error, the quick freeze method is utilized to halt operation of the computing system. In this way, the computing system is stopped as quickly as possible so that as much information about the error as possible may be collected.

I claim:

1. A method for halting operation of all computing sections within a computing system when a first computing section within the computing system detects an error, the method comprising the steps of:
   (a) immediately halting operation of the first computing section;
   (b) notifying, by the first computing section, all computing sections within the computing system which are adjacent to the first computing section of the detection of the error, wherein every computing section which receives notification of the detection of the error becomes a notified computing section; and,
   (c) when a computing section within the computing system first becomes a notified computing section, performing the following substeps by the notified computing section:
      (c1) immediately halting operation of the notified computing section, and
      (c2) notifying all computing sections within the computing system which are adjacent to the notified computing section of the detection of the error, the adjacent computing sections which are not already notified computing sections becoming notified computing sections.

2. A method for halting operation of all computing sections within a computing system when a first computing section within the computing system detects an error, the method comprising the steps of:
   (a) notifying all computing sections within the computing system of the detection of the error, wherein each computing section which has been notified of the detection of the error continues operation until all computing sections within the computing system have been notified of the detection of the error; and,
   (b) upon all computing sections within the computing system being notified of the detection of the error, simultaneously halting operation of all computing sections within the computing system.

3. A method as in claim 2 wherein step (a) includes the following substeps:
   (a1) notifying, by the first computing section, all computing sections within the computing system which are adjacent to the first computing section of the detection of the error, wherein every computing section which receives notification of the detection of the error becomes a notified computing section; and,
   (a2) when a computing section within the computing system first becomes a notified computing section, notifying, by the notified computing section, all computing sections adjacent to the notified computing section of the detection of the error, the adjacent computing sections which are not already notified computing sections becoming notified computing sections.

4. A method as in claim 2 wherein step (a) includes the following substeps:
   (a1) notifying, by the first computing section, a central control module of the detection of the error; and,
   (a2) notifying, by the central control module, all computing sections within the computing system of the detection of the error.

5. A method for halting operation of all computing sections within a computing system upon detection of an error, the method comprising the steps of:
   (a) when configuring the computing system, selecting one of an immediate halt of the computing system upon detection of an error and a delay halt of the computing system upon detection of an error;
   (b) when a first computing section within the computing system detects an error and in step (a) the immediate halt has been selected, performing the following substeps:
      (b1) immediately halting operation of the first computing section,
      (b2) notifying, by the first computing section, all computing sections within the computing system which are adjacent to the first computing section of the detection of the error, wherein every computing section which receives notification of the detection of the error becomes a notified computing section, and
      (b3) when a computing section within the computing system first becomes a notified computing section, performing the following substeps by the notified computing section:
      immediately halting operation of the notified computing section, and
      notifying all computing sections within the computing system which are adjacent to the notified computing section of the detection of the error, the adjacent computing sections which are not already notified computing sections becoming notified computing sections; and,
   (c) when a first computing section within the computing system detects an error and in step (a) the delay halt has been selected, performing the following substeps:
- (c1) notifying all computing sections within the computing system of the detection of the error, and
- (c2) simultaneously halting operation of all computing sections within the computing system.

6. A method as in claim 5 wherein step (c1) includes the following substeps:

notifying, by the first computing section, all computing sections within the computing system which are adjacent to the first computing section of the detection of the error, wherein every computing section which receives notification of the detection of the error becomes a notified computing section; and, when a computing section within the computing system first becomes a notified computing section, notifying, by the notified computing section, all computing sections adjacent to the notified computing section of the detection of the error, the adjacent computing sections which are not already notified computing sections becoming notified computing sections.

7. A method as in claim 5 wherein step (c1) includes the following substeps:

notifying, by the first computing section, a central control module of the detection of the error; and, notifying, by the central control module, all computing sections within the computing system of the detection of the error.

* * * * *